United States Patent [19]
Cappels

[11] Patent Number: 6,166,782
[45] Date of Patent: *Dec. 26, 2000

[54] METHOD AND APPARATUS FOR REDUCING VISIBILITY OF DAMPING WIRES IN APERTURE GRILL DISPLAY TUBES

[75] Inventor: Richard D. Cappels, San Jose, Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/790,095

[22] Filed: Jan. 29, 1997

[51] Int. Cl.[7] .................... H04N 5/213; H04N 5/217
[52] U.S. Cl. .................... 348/806; 348/807; 348/615; 348/616
[58] Field of Search ..................... 348/615, 616, 348/617, 191, 806, 807

[56] References Cited

U.S. PATENT DOCUMENTS

| | | | |
|---|---|---|---|
| 4,106,866 | 8/1978 | Shimada et al. | 353/29 |
| 4,240,073 | 12/1980 | Seats et al. | 340/703 |
| 4,387,394 | 6/1983 | Powell | 358/139 |
| 4,441,120 | 4/1984 | Gerritsen | 348/191 |
| 4,602,272 | 7/1986 | Ducshl | 348/191 |
| 4,602,273 | 7/1986 | Carlson | 348/450 |
| 5,265,200 | 11/1993 | Edgar | 345/431 |
| 5,369,330 | 11/1994 | Albara | 313/402 |
| 5,391,957 | 2/1995 | Fendley | 313/402 |
| 5,424,780 | 1/1995 | Cooper | 348/428 |
| 5,432,349 | 7/1995 | Wood | 250/336.1 |
| 5,512,961 | 4/1996 | Cappels, Sr. | 348/658 |
| 5,594,248 | 1/1997 | Tanaka | 250/332 |
| 5,739,870 | 4/1998 | Simpson | 348/628 |
| 5,793,344 | 8/1998 | Koyama | 348/191 |

*Primary Examiner*—John K. Peng
*Assistant Examiner*—Linus H. Lo
*Attorney, Agent, or Firm*—Carr & Ferrell LLP

[57] ABSTRACT

A method and apparatus for reducing visibility of damping wire artifacts in aperture grill display tubes comprises a sensor device for locating the artifacts and responsively generating amplitude values, a processor for receiving the generated amplitude values and responsively calculating correction values, and a compensator device coupled to the processor for utilizing the correction values to correct said artifacts.

20 Claims, 11 Drawing Sheets

| DISPLAY LIST A 1010 | | |
|---|---|---|
| 0          10 | 11          17 | 18          22 |
| Row Address | Column Address | Video Value |
| Row Address | Column Address | Video Value |
| Row Address | Column Address | Video Value |
| Row Address | Column Address | Video Value |
| Row Address | Column Address | Video Value |

| DISPLAY LIST B 1040 | | |
|---|---|---|
| 0          10 | 11          17 | 18          22 |
| Row Address | Column Address | Video Value |
| Row Address | Column Address | Video Value |
| Row Address | Column Address | Video Value |
| Row Address | Column Address | Video Value |
| Row Address | Column Address | Video Value |

Fig. 10

METHOD AND APPARATUS FOR REDUCING VISIBILITY OF DAMPING WIRES IN APERTURE GRILL DISPLAY TUBES

BACKGROUND OF THE INVENTION

1. Field of the Invention

This invention relates generally to video display monitors and more particularly to a method and apparatus for reducing visibility of damping wires in aperture grill display tubes.

2. Description of the Background Art

Accurate representation of visual information is a significant consideration of manufacturers, designers and user of video display monitors. Aperture grill cathode ray tubes (CRTs) are devices which are often used in conventional video display monitors.

Referring now to FIG. 1, a diagram of a display CRT 110 is shown, according to the present invention. CRT 110 includes a glass screen 112 with an inner surface that is covered with a phosphor coating 114. In aperture grill CRTs, an electron gun 116 causes electron beams 118 to pass through vertical slits etched in a thin sheet of metal which comprises an aperture grill 120. The slits are part of the mechanism that directs the red, green and blue electron beams 118 to their respective phosphors 114. The electron beams 118 emitted from the electron gun 116 assembly pass through the aperture grill 120 on the way to the phosphor coating 114, which responds to the electron bombardment by emitting light. The aperture grill 120 partially blocks the electron beams 118, casting shadows on the phosphor coating 114. The shadows line up with black stripes that separate the red, green and blue vertical phosphor stripes on phosphor coating 114, and because of the fine pitch and regular spacing, the vertical stripes are usually not noticed.

Referring now to FIG. 2, a diagram of the FIG. 1 aperture grill 120 is shown, according to the present invention. Because the metal aperture grill 120 is stretched taut and welded in place over a metal frame, the sheet has a tendency to "ring" in response to mechanical stimulus, such as mechanical shock or coupled acoustic power. Such ringing causes distracting time-varying luminance modulation as the shadows of the aperture grill 120 beat with the pattern of the phosphor stripes on phosphor coating 114.

A countermeasure employed to minimize the extent of the ringing is the addition of one or more damping wires 210 stretched across the grill 120 assembly, perpendicular to the vertical slits. As a result of friction with the moving aperture grill 120 and internal elastic losses, this wire dissipates mechanical energy to thereby reduce the extent of the ringing. The damping wires 210 cast a shadow on the phosphor-coating 114, but since the damping wire 120 diameter is smaller than that of the visible beams 118 cross section, the shadow is of relatively low contrast. There are typically two damping wires 210 present if CRT 110 is 17 inches or larger and there is typically one damping wire if CRT 110 is smaller than 17 inches. The damping wire shadow is caused by the modulation of the amplitude of the electron beams 118 incident on the phosphor coating 114.

Since there are only one or two damping wire 210 shadows on the screen of CRT 110, and they are perpendicular to the regular fine-pitch structure of the vertical stripes, they are sometimes easily observed, though often not distracting. None the less, when first observed, these shadows are often perceived by as defects in CRT 110. This perception is sometimes a factor in customer satisfaction and overall perception of image and product quality. Therefore, an improved method and apparatus for reducing visibility of damping wires in aperture grill display tubes is needed.

SUMMARY OF THE INVENTION

In accordance with the present invention, a method and apparatus are disclosed for reducing visibility of damping wires in aperture grill display tubes. This invention reduces the visibility of damping wire shadows by modulating the amplitude of the CRT electron beam to compensate for the modulation imposed by the damping wires, thus canceling the damping wire shadow. The invention is composed of an apparatus and technique to locate the damping wire shadow with respect to the displayed video image, and an apparatus that generates the compensation signal and applies to the video signal to compensate for the damping wire shadow.

In the preferred embodiment of the present invention, a detector device measures amplitude values of selected areas on a CRT screen as individual CRT scan rows are sequentially illuminated. The measured amplitude values are then processed with a differentiation routine to determine the specific location of the damping wire shadow on the CRT screen.

Correction values to compensate for the damping wire shadow are calculated by subtracting the scan row amplitude value at the damping wire shadow from an average of the scan row amplitude values for the two scan rows adjacent the damping wire shadow. The correction values are then converted into corresponding video values which are stored sequentially and alternately into two display lists along with corresponding location information such as column and row addresses.

A compensator device then sequentially provides the video values and their corresponding location information to video amplifiers to drive the display CRT. The present invention thus advantageously compensates the CRT electron beam current at the appropriate time to effectively remove the damping wire shadows from the aperture grill display tube.

BRIEF DESCRIPTION OF THE DRAWINGS

FIG. 10 is a block diagram of display lists according to the present invention.

DETAILED DESCRIPTION OF THE PREFERRED EMBODIMENT

The present invention discloses a method and apparatus for reducing visibility of damping wires in aperture grill display tubes and comprises a sensor device for locating the artifacts and responsively generating amplitude values, a processor for receiving the generated amplitude values and responsively calculating correction values, and a compensator device coupled to the processor for utilizing the correction values to correct said artifacts.

Figure 1:
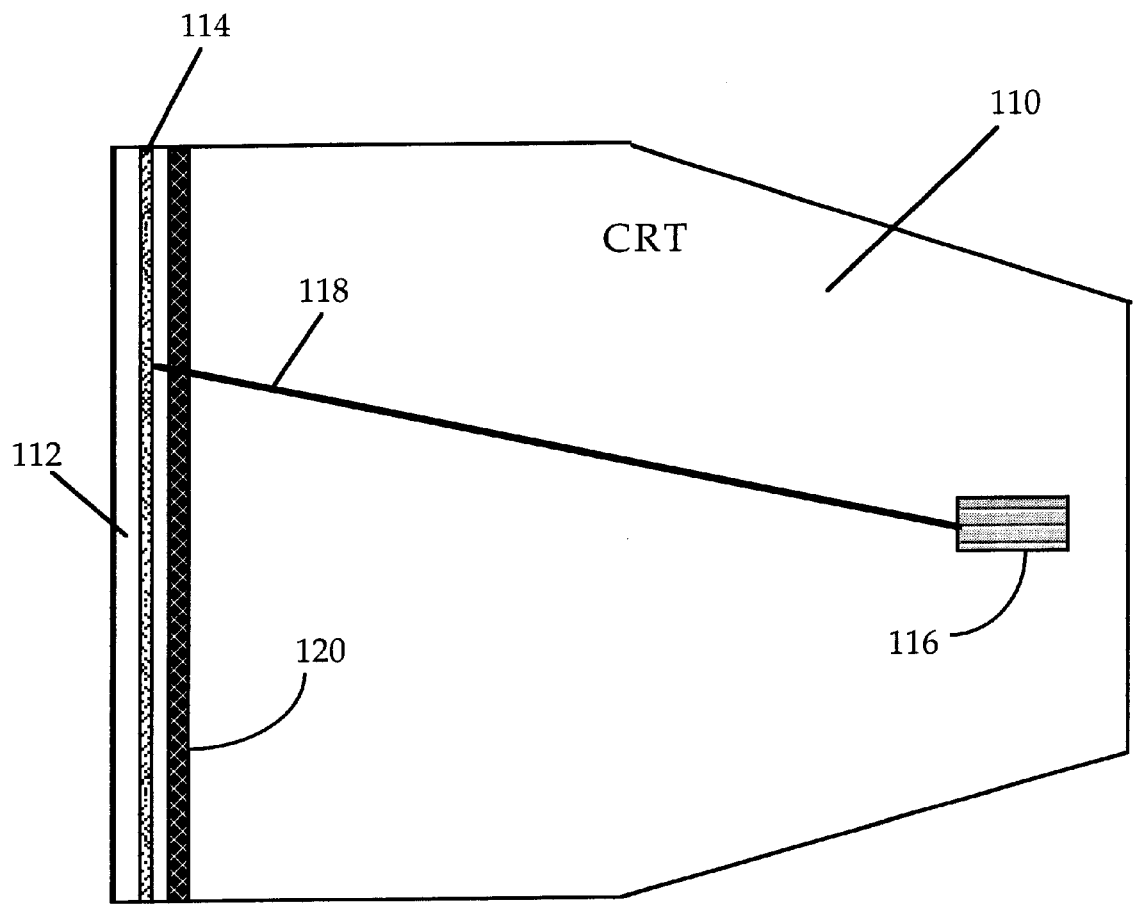
FIG. 1 is a diagram of a display CRT according to the present invention.
Figure 2:
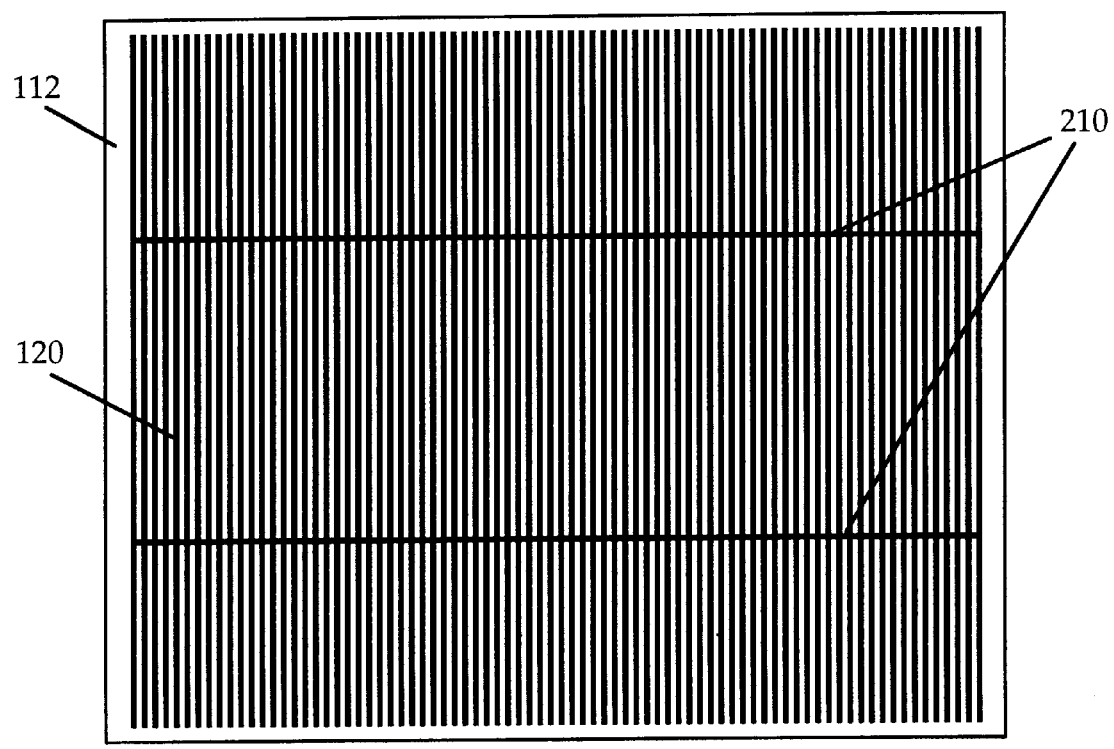
FIG. 2 is a diagram of the aperture grill from the FIG. 1 display CRT according to the present invention.
Figure 3:
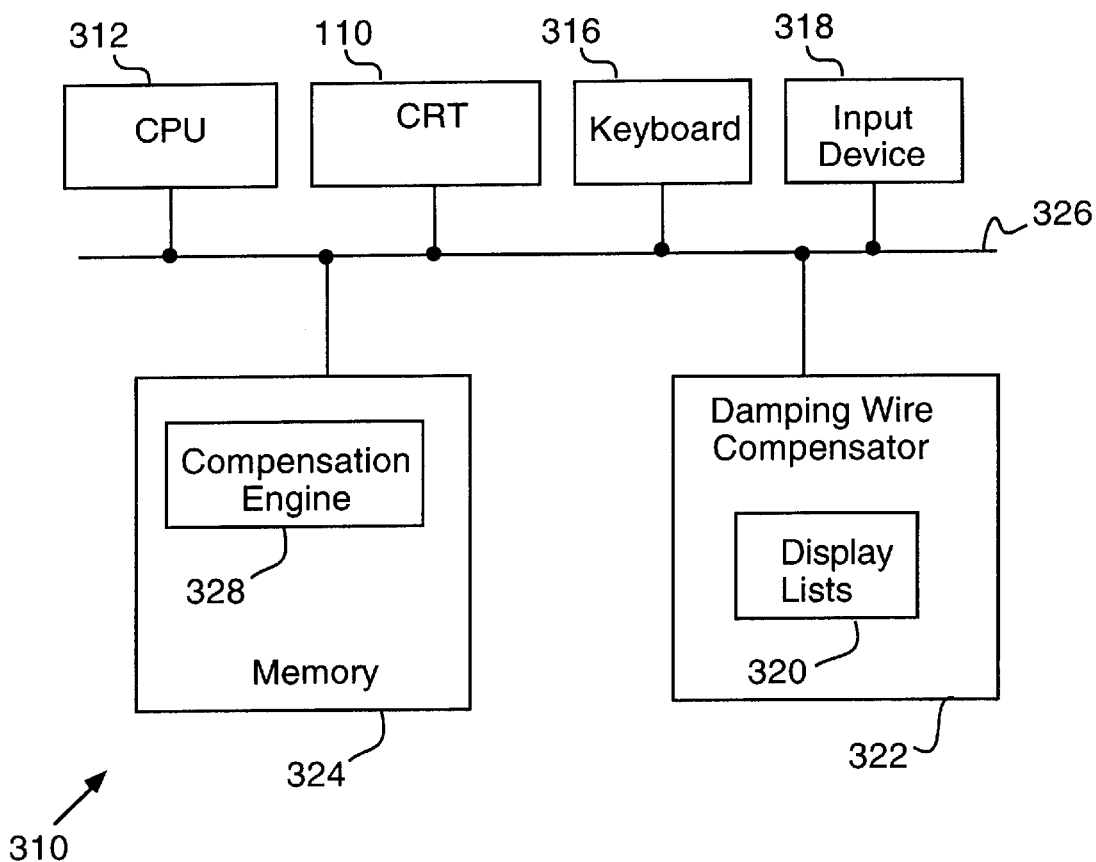
FIG. 3 is a block diagram of a computer system including the display CRT of FIG. 1 and a damping wire compensator, according to the present invention.

Referring now to FIG. 3, a block diagram of a computer system 310 is shown, according to the present invention. Computer system 310 preferably comprises a central processing unit (CPU) 312, a display CRT 110, a keyboard 316, an input device 318, a damping wire compensator 322 and a memory 324. Memory 324 typically contains an operating system and at least one application program (not shown), and a compensation engine 328. In the preferred embodiment, the compensation engine 328 is a software routine that provides a set of instructions to CPU 312 for reducing visibility of damping wires 210 in CRT 110. The operation of compensation engine 328 is further described below in conjunction with FIG. 4. Each element of computer system 310 preferably has an input and an output coupled to a common system bus 326. Memory 324 may alternatively comprise various storage-device configurations, including Random-Access-Memory (RAM), Read-Only-Memory (ROM), and non-volatile storage devices such as floppy-disks and hard disk-drives. System bus 326 may alternatively be connected to a communications interface to permit computer system 310 to output information to a computer network.

Figure 4:
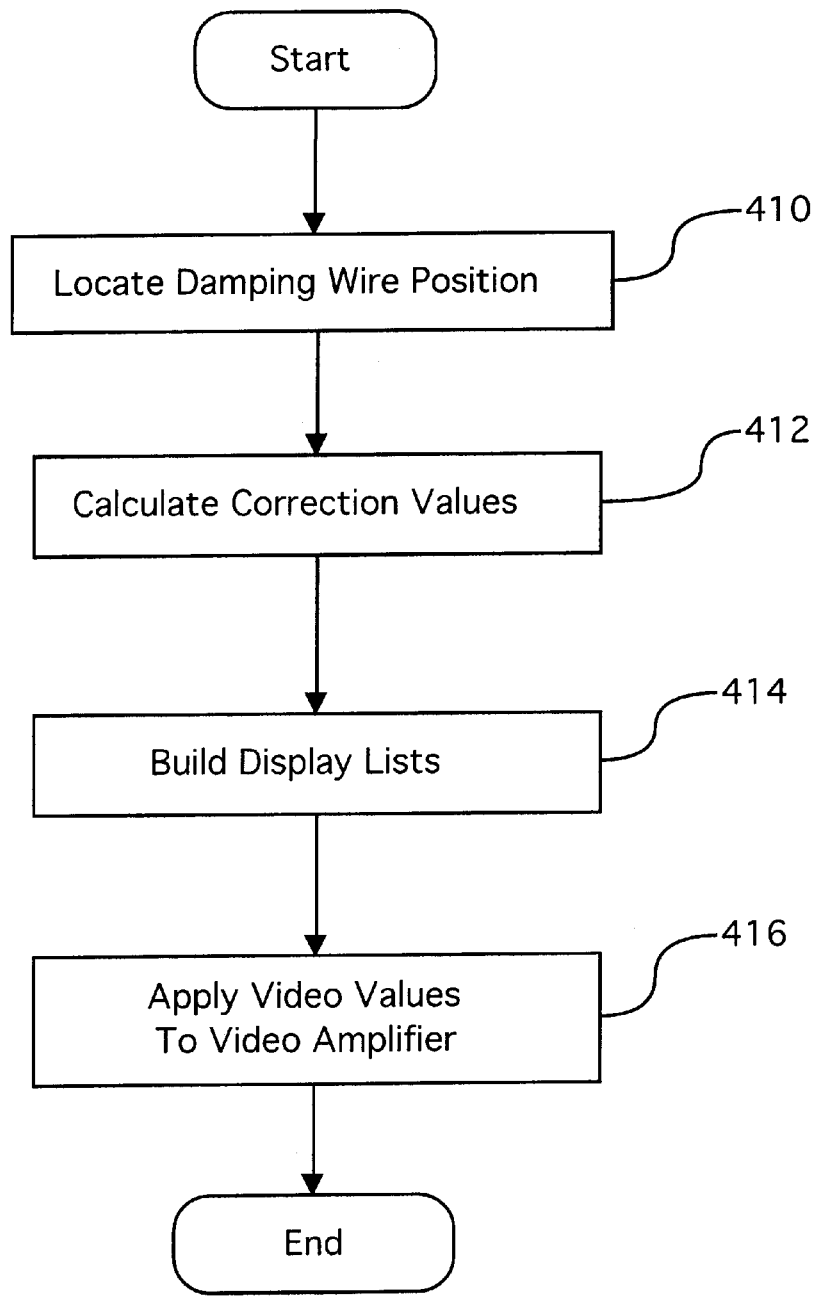
FIG. 4 is a flowchart of a method for reducing visibility of damping wires in a display CRT, according to the present invention.

Referring now to FIG. 4, a flowchart of a method for reducing visibility of damping wires 210 is shown. In the preferred embodiment, the present invention causes CPU 312 to coordinate and perform the method steps of FIG. 4 in response to the program instructions of compensation engine 328. In alternate embodiments, the FIG. 4 process may be performed using hardware implementations or firmware devices. In step 410, the present invention locates the positions of all damping wires 210 present in the aperture grill 120 of CRT 110. Techniques for locating damping wires 210 are further discussed below in conjunction with FIGS. 5–8.

Then, in step 412, the present invention calculates correction values which correspond to the location and intensity of the damping wires 210. Further details for calculating correction values are discussed below in conjunction with FIG. 9. Next, the present invention, in step 414, builds display lists 320 by converting the calculated correction values into corresponding video values and then storing the converted video values along with their corresponding locations on the CRT 110 screen. Construction of display lists 320 is further discussed below in conjunction with FIG. 10. Finally, in step 416, the present invention applies the converted video values to a video amplifier in CRT 110 using damping wire compensator 322 which is further discussed below in conjunction with FIG. 11.

Figure 5:
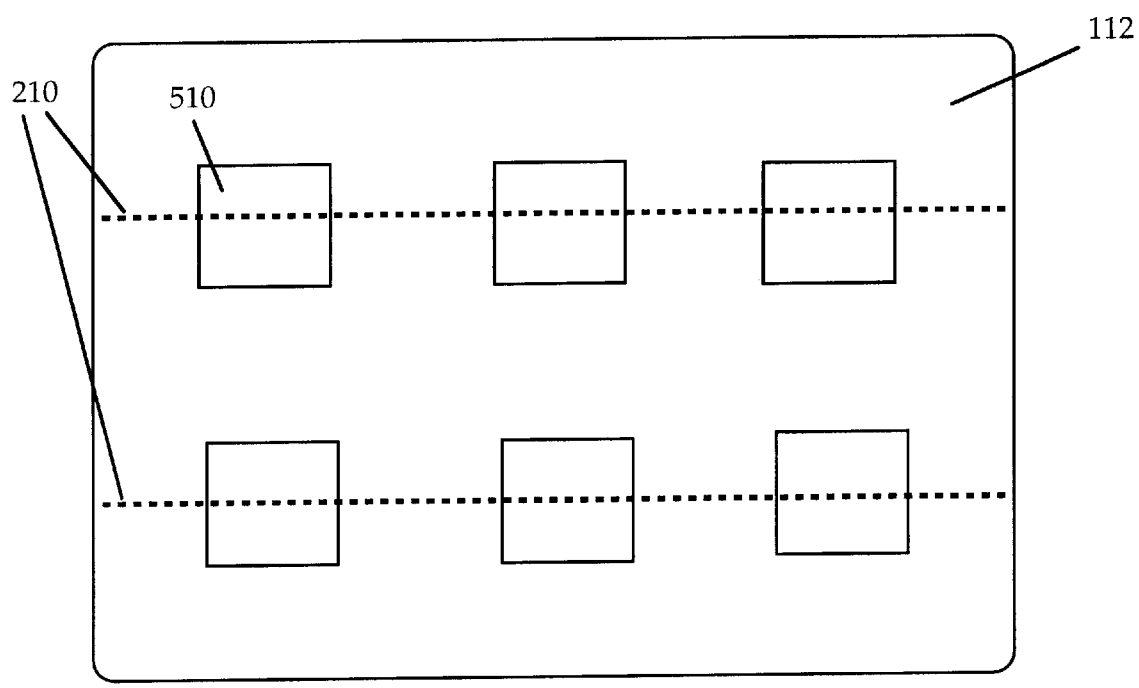
FIG. 5 is a block diagram illustrating a general method for determining damping wire locations in a display CRT, according to the present invention.

Referring now to FIG. 5, a block diagram illustrating a general method for determining damping wire 210 locations is shown. FIG. 5 depicts a frontal view of display screen 112 and the location of damping wires 210. Also depicted is a measurement area 510. In practice, several measurement areas 510 are imaged (possible while performing white uniformity compensation) preferably using a conventional light-sensing device. Some of these measurement areas 510 will contain images of the damping wire 210 shadow (such as the six areas indicated in FIG. 5).

The location of each of the measurement areas 510 relative to their screen 112 location is known, and they are analyzed to determine the position of the damping wire 210 shadow (all the way across the screen 112) and the transmission reduction due to the shadow at each measurement area 510 affected by the shadow. The amount of attenuation of the shadow at each measurement area 510 can be measured to determine the amount of compensation required, or a nominal correction for the particular display CRT 110 under consideration can be used. These data are then used to generate a display list 320 (FIG. 3) for the damping wire compensator 322. Alternately, the location of the damping wire 210 shadow may be found by using a spatial imaging device. For example, a television camera may be used to image an area of the raster to locate the damping wire 210.

Figure 6:
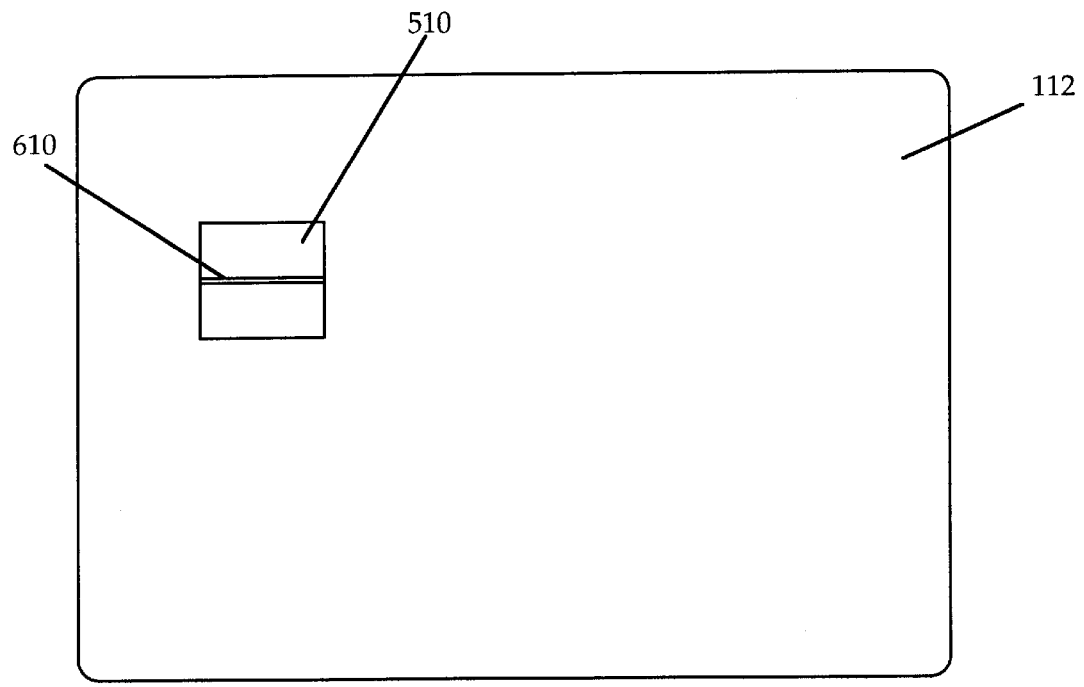
FIG. 6 is a block diagram illustrating a preferred method for measuring scan row amplitudes in a display CRT, according to the present invention.

Referring now to FIG. 6, a block diagram illustrating the preferred method for determining damping wire 210 locations is shown. Initially, screen 112 of CRT 110 is not illuminated by electron beams 118. The measurement area 510 in screen 112 is then imaged by measuring screen 112 luminance as segments of pixels are illuminated, one horizontal scan row 610 at a time, sequentially advancing the horizontal scan row 610 from top to bottom of measurement area 510, where the user has placed a photo detector. The relative luminance resulting from each measured scan row 610 is stored as an amplitude value and the amplitude values are then used to determine the location of the damping wire 210.

Figure 7:
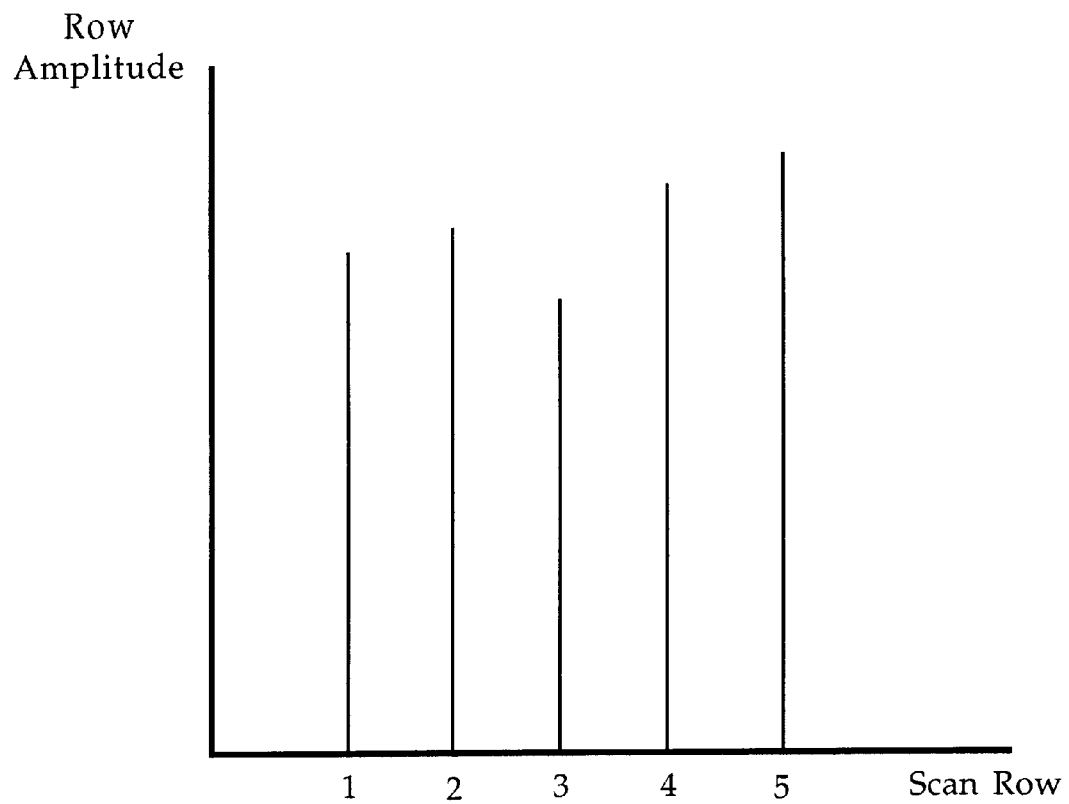
FIG. 7 is an graph of sample scan row amplitudes used to determine damping wire locations according to the present invention.

Referring now to FIG. 7, a graph of sample scan row 610 amplitudes is shown. The specific FIG. 7 amplitude values are presented for purposes of explanation and may readily include other measured amplitude values in alternate examples. The FIG. 7 graph displays successive scan row 610 samples on the horizontal axis and corresponding measured scan row 610 amplitudes on the vertical axis. In the FIG. 7 example, the damping wire 210 shadow corresponds with sample scan row number 3 because scan row number 3 has the lowest measured amplitude. In other embodiments, damping wire shadow 210 may be located on another scan row 610, and furthermore, measurement area 510 may readily comprise a different total number of scan rows 610.

Figure 8:
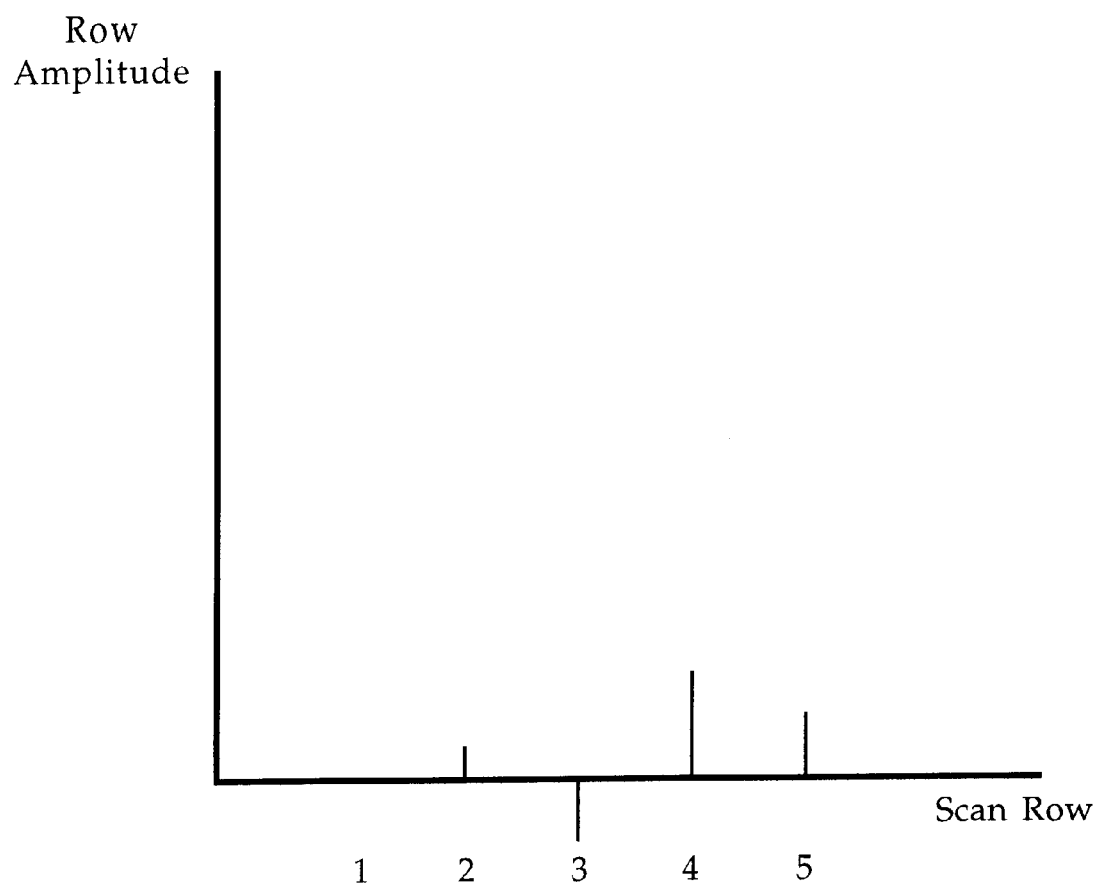
FIG. 8 is a graph of the FIG. 7 sample scan row amplitudes after they are processed using a differentiation routine, according to the present invention.

Referring now to FIG. 8, a graph of the FIG. 7 sample scan row 610 amplitudes is shown after they have been processed using a differentiation routine, according to the present invention. The differentiation routine may be performed by subtracting the scan row 610 amplitude of each sample from the scan row 610 amplitude of the previous sample. The differentiation values thus are equal to the difference between successive adjacent scan rows 610. After differentiation, the reverse in slope between the second and third scan row 610 samples and again between the third and fourth scan row 610 samples indicates that the location of the damping wire 210 shadow corresponds with sample number 3.

The differentiation routine removes the low-frequency variation in amplitude that results from non-uniform sensitivity of the photo detector probe and facilitates location of damping wire 210. The amplitude of the particular scan row 610 of damping wire 210 may then be compared with the two adjacent scan rows 610 to determine the amount of correction needed to compensate for the damping wire 210 shadow.

The error caused by the damping wire 210 shadow may be found by subtracting the FIG. 8 differentiation value at the location of the damping wire 210 shadow (here, sample scan row number 3) from the average of the two adjacent differentiated scan rows 610 (here, scan row numbers 2 and 4). This error value may then be compared to the amplitude of the undifferentiated amplitude value of scan row 610 at the damping wire 210 location to determine the amount of correction required to compensate for the damping wire 210 shadow.

Figure 9:
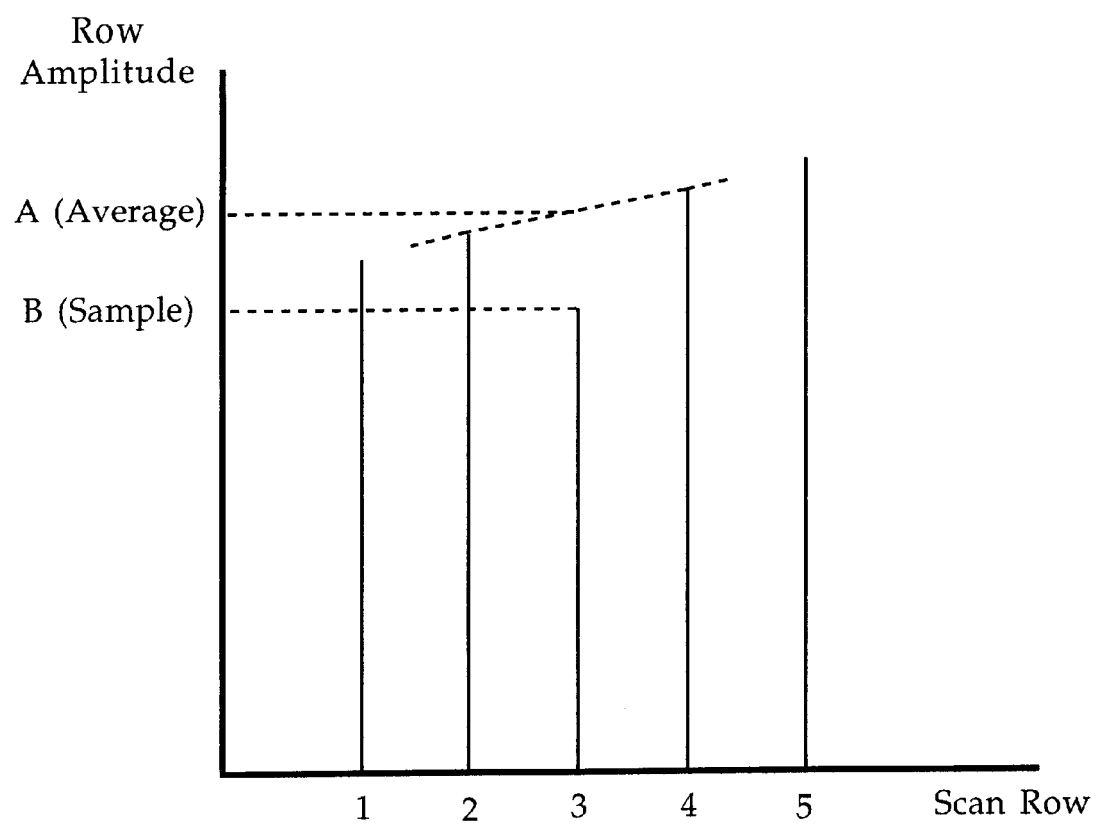
FIG. 9 is a graph of sample scan row amplitudes used to calculate a correction value according to the present invention.

Referring now to FIG. 9, a graph of sample scan row 610 amplitudes used to calculate a correction value is shown, according to the present invention. FIG. 9 shows a scan row 610 amplitude value A which is the average of the amplitudes for the scan rows (here, scan rows 2 and 4) which are adjacent to the scan row 610 that is shadowed by damping wire 210 (here, scan row 3). FIG. 9 also shows a scan row 610 amplitude value B which is the amplitude of the scan row 610 at the location of the damping wire 210.

In the preferred embodiment, the intensity of the electron beam 118 at scan row 3 must be increased by a factor equal to A/B to compensate for the shadow cast by damping wire 210. In other words, the amplitude B must be increased by a value equal to A minus B, to effectively raise the amplitude of value B until it equals the amplitude of value A. Alternatively, once the location of the damping wire 210 shadow is found, successive correction values may be applied to that location until the amplitude at that location equals the average of the two adjacent locations.

Referring now to FIG. 10, a block diagram of sample display lists 320 is shown, according to the present invention. The FIG. 10 display lists 320 are presented as an example for purposes of discussion, and in alternate examples, other quantities of video values may be stored in display lists 320. The present invention requires the display system to be able to relate data signal levels (correction values) to video drive levels. The information required to do so may be obtained by monitoring the beam current 118 while presenting various correction values to the video amplifier and inferring an intensity from prerecorded luminous sensitivity data. U.S. Pat. No. 5,512,961 discloses and teaches related techniques and is therefore hereby incorporated by reference.

In the preferred embodiment, CPU 312 converts the calculated correction values into corresponding video values and then stores the video values into display lists 320. The conversion process is typically performed through the use of a conversion table which reflects the luminance correction transfer function of CRT 110. The conversion table may be constructed by measuring display screen 112 for those luminance changes which correspond to the range of possible correction values. CPU 312 may then readily convert calculated correction values into video values by referencing the compiled conversion table.

In practice, display lists 320 include display list A 1010 and display list B 1040 which each comprise a series of video values and corresponding row and column addresses. Each video value represents the calculated amount of adjustment needed to compensate for the damping wire 210 shadow at a given location on screen 112. The row and column addresses correspond to the specific location on screen 112 to which a particular video value pertains.

The display lists 320 are sets of address and video values that are applied whenever the corresponding addresses are encountered by beam 118 on screen 112. As such, a nominal value relating to no gain increase is applied at the start of the first row and column, and then when another row and column (whose address corresponds to an entry in the display lists 320) are encountered, the corresponding video value for that address is applied to the beam current 118. The display lists 320 are kept in the same sequence as the addresses are generated, and alternate entries are kept in two sets of display list A and B (1010 and 1040) so that the data from one display list can be read out while the contents of the other display list is being fetched. This approach allows the use of lower speed processes.

The scanning of screen 112 (scan row 610 by scan row 610) to detect the location of the damping wire 210 shadow (if a spatial imaging device is not used) is ideally performed by loading the appropriate address and video values into the display lists 320 and then using them to drive the CRT 110 video amplifier inputs rather than the gain modulation inputs. Alternatively, the host system 310 (the system providing the video source) can provide a signal corresponding to a full white raster, and an extra bit or reserved value in the video value register can be used to blank screen 112 in all but the selected row segments.

Figure 11:
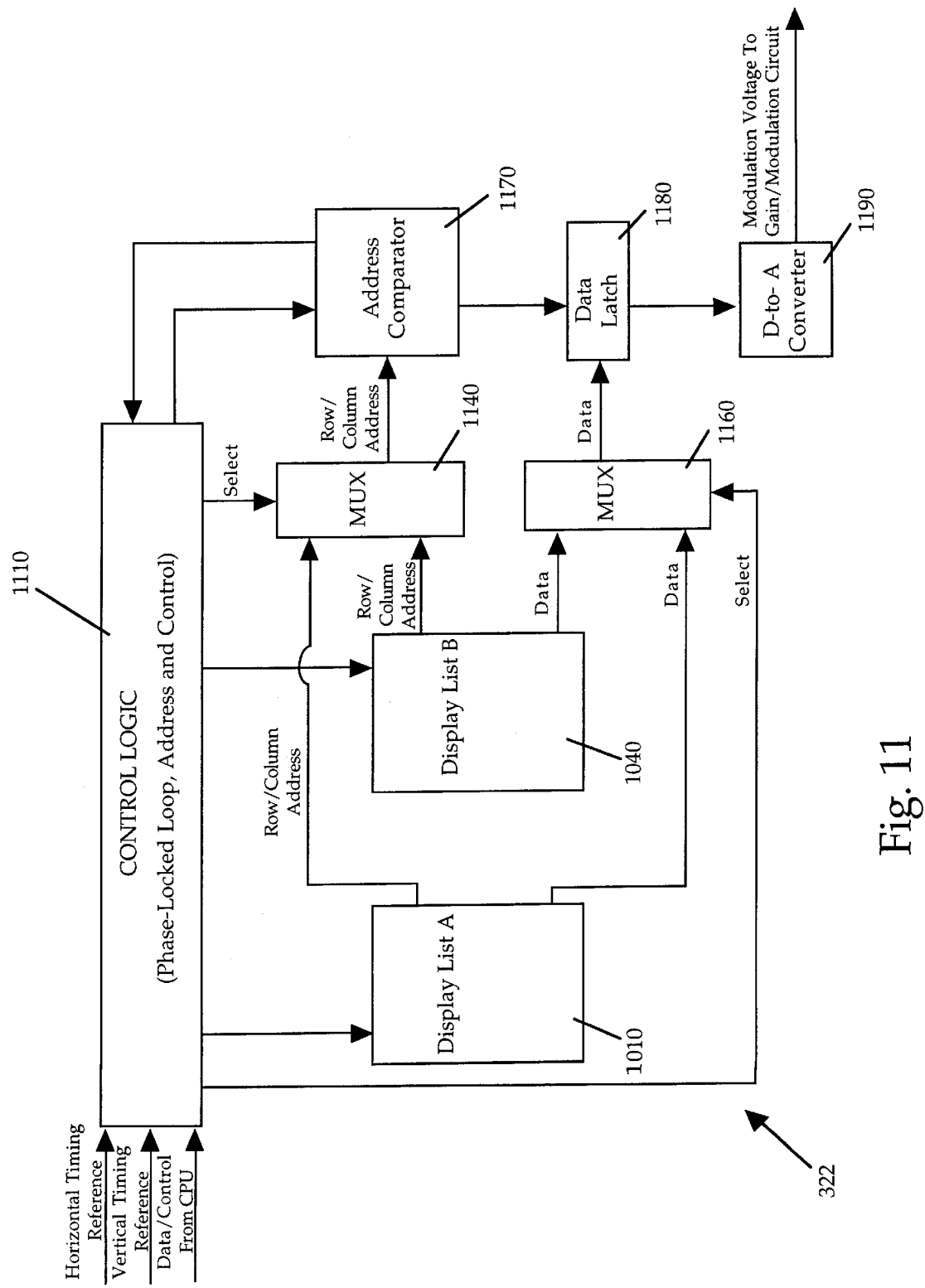
FIG. 11 is a schematic diagram of the preferred embodiment for the damping wire compensator of the present invention.

Referring now to FIG. 11, a schematic diagram of the preferred embodiment for the damping wire compensator 322 is shown. The present invention's correction signals are preferably generated by a list-driven damping wire compensator 322 as shown in FIG. 11. Timing and control signals derived from the horizontal and vertical video synchronization pulses are used to address the display list A 1010 and display list B 1040 to select which display list 320 correction value is fed to D-to-A converter 1190 to drive the gain modulation input of the video amplifiers(not shown) in CRT 110.

In the preferred embodiment, control logic 1110 provides an address corresponding to the current location of electron beam 118 (on screen 112) to address comparator 1170. Display list A 1010 and display list B 1040 contain alternate sequential entries of video values and their corresponding column and row addresses, as described above in conjunction with FIG. 10. Initially, control logic 1110 gates row/column address information from display list A 1010 into multiplexer (MUX) 1140, and simultaneously provides data (video values) from display list A 1010 into multiplexer (MUX) 1160.

Control logic 1110 preferably selects the "Display list A" input of MUX 1140 to provide the row/column address to address comparator 1170 and the corresponding correction value to data latch 1180. When the row/column address of the correction data matches the current address (location) of the electron beam 118, address comparator 1170 gates the correction value from data latch 1180 through D-to-A converter and on to the gain modulation circuit of the video amplifiers controlling electron beam gun 116.

Address comparator 1170 then sends an acknowledge signal to control logic 1110 to report that the correction value has been sent to the gain modulation circuit. Control logic 1110 then responsively repeats the above process using display list B 1040 as the source of the correction information. By repeating the above sequences, compensator 322 thus alternately and sequentially fetches correction information from the two display lists (1010 and 1040) and thus effectively compensates for the shadow caused on display screen 112 by damping wire 210.

A number of additional considerations and alternate techniques should be mentioned in connection with the present invention. For example, the correction signal may be applied to the gain modulation inputs of the Red, Green and Blue video amplifiers. It should only be necessary to generate one signal to apply to all three channels, but in the case of a system with severely degraded vertical convergence, separate corrections for Red, Green and Blue may be worthwhile.

For the case in which two or more scan rows 610 are affected by a single damping wire 210 shadow, the amplitudes of the correction signals on the two damping wires 210 can be adjusted so they both contribute to the compensation in proportion to their respective affects from the damping wire 210 shadow. In other words, each line would be compensated just enough to bring its amplitude over that segment up to the level it would be at if there were no shadow.

The FIG. 11 data latch 1180 is only needed to de-glitch the output of the multiplexer 1160, and may not be needed in all implementations. Additionally, the compensation signal can be generated manually by the user guiding the placement and amplitude of the compensation signals, such as by using a mouse to place the compensation segments, and then adjusting the amplitude with the cursor keys on a keyboard.

Multiple raster formats may advantageously be accommodated automatically by using multiple memory devices. Furthermore, the compensation could be made to track changes in raster size and position by monitoring the deflection current and high voltage.

Raster shifts resulting from changes in the ambient magnetic fields can be corrected. Shifts in the vertical and horizontal directions resulting from changes in the magnetic fields along the respective horizontal axis and vertical axis of CRT 110 would result in the most noticeable changes in the compensation. The scan row and column addresses in display lists 320 can be adjusted by adding or subtracting counts proportional to the intensity of the ambient magnetic fields in the respective horizontal axis and vertical axis of CRT 110.

The invention has been explained above with reference to a preferred embodiment. Other embodiments will be apparent to those skilled in the art in light of this disclosure. For example, the present invention may be used to effectively compensate for variations in amplitude from causes other than the damping wires 210 described in the preferred embodiment above. Therefore, these and other variations upon the preferred embodiments are intended to be covered by the present invention, which is limited only by the appended claims.

What is claimed is:

1. Apparatus for reducing the visibility of the shadow cast by a damping wire on the screen of a display device, comprising:

a sensor device for locating said shadow on said screen of said display device and responsively generating amplitude values of the area of said screen immediately adjacent said shadow;

a processor for receiving said generated amplitude values and responsively calculating correction values; and a compensator device coupled to said processor for utilizing said correction values for reducing the visibility of said shadow on said screen.

2. The apparatus of claim 1 wherein a compensation engine program controls said processor.

3. The apparatus of claim 1 wherein said correction values are converted into video values which are alternately and sequentially stored in a plurality of display lists along with corresponding location addresses.

4. Apparatus for correcting artifacts on the screen of a display device, comprising:

a sensor device for locating said artifacts on said screen and responsively generating amplitude values of the area of said screen immediately adjacent said artifacts, wherein said artifacts may include at least one damping wire shadow that is visible on said screen, a processor for receiving said generated amplitude values and responsively calculating correction values, said correction values being converted into video values which are alternately and sequentially stored in a plurality of display lists along with corresponding location addresses; and a compensator device coupled to said processor for utilizing said correction values for reducing the visibility of said artifacts on said screen of said display device, said display device comprising a cathode ray tube.

5. The apparatus of claim 4 wherein a shadow is located by illuminating successive scan rows on said screen of said cathode ray tube and then detecting the scan row having a least amplitude value.

6. The apparatus of claim 5 wherein said correction values are calculated by subtracting said least amplitude value from an average of two of said amplitude values from said scan rows immediately adjacent to the scan row affected by said damping wire shadow.

7. The apparatus of claim 4 wherein said compensator device converts said video values to analog voltages and then applies said analog voltages to video amplifiers driving said cathode ray tube.

8. The apparatus of claim 1 wherein said amplitude values are processed with a differentiation routine to locate said shadow on said screen of said display device, said display device comprising a cathode ray tube.

9. A method for reducing the visibility of the shadow cast by a damping wire on the screen of a display device comprising the steps of:

using a sensor device to locate said shadow on the screen of said display device and responsively generate amplitude values of the area of said screen immediately adjacent said shadow;

calculating correction values from said generated amplitude values using a processor; and utilizing said correction values to reduce the effects of the visibility of said shadow on the screen of said display device by using a compensator device coupled to said processor.

10. The method of claim 9 wherein a compensation engine program controls said processor.

11. The method of claim 9 wherein said correction values are converted into video values which are alternately and sequentially stored in a plurality of display lists along with corresponding location addresses.

12. A method for correcting artifacts on the screen of a display device comprising the steps of:

using a sensor device to locate said artifacts on the screen of said display device and responsively generate amplitude values of the area of said screen immediately adjacent said artifacts, wherein said artifacts may include at least one damping wire shadow that is visible on the screen of said display device;

calculating correction values from said generated amplitude values using a processor, said correction values being converted into video values which are alternately and sequentially stored in a plurality of display lists along with corresponding location addresses; and utilizing said correction values to reduce the effects of the visibility of said artifacts on the screen of said display device by using a compensator device coupled to said processor, said display device comprising a cathode ray tube.

13. The method of claim 12 wherein a shadow is located by illuminating successive scan rows on the screen of said display device and then responsively detecting and locating the scan row having the smallest one of said amplitude values.

14. The method of claim 13 wherein said correction values are calculated by subtracting said least amplitude value from an average of two of said amplitude values from the scan rows immediately adjacent to the scan row affected by said damping wire shadow.

15. The method of claim 12 wherein said compensator device converts said correction values to analog voltages and then applies said analog voltages to video amplifiers driving said display device.

16. The method of claim 9 wherein said amplitude values are processed with a differentiation routine to locate said shadow on said screen, and said display device comprises a cathode ray tube.

17. A computer-readable medium comprising program instructions for reducing the visibility of the shadow cast by a damping wire on the screen of a display device by performing the steps of:

using a sensor device to locate said shadow on said screen of said display device and responsively generate amplitude values of the area of said screen immediately adjacent said shadow;

calculating correction values from said generated amplitude values using a processor; and utilizing said correction values to reduce the visibility of said shadow on said screen of said display device by using a compensator device coupled to said processor.

18. A computer-readable medium comprising program instructions for correcting artifacts on the screen of a display device by performing the steps of:

using a sensor device to locate said artifacts on said screen of said display device and responsively generate amplitude values of the area of said screen immediately adjacent said artifacts, wherein said artifacts may include at least one damping wire shadow that is visible on the screen of said display device;

calculating correction values from said generated amplitude values using a processor; and utilizing said correction values to reduce the visibility of said artifacts on said screen of said display device by using a compensator device coupled to said processor, said display device comprising a cathode ray tube.

19. The computer-readable medium of claim 18 wherein a shadow is located by illuminating successive scan rows on the screen of said display device and responsively detecting and locating the scan row having the smallest one of said amplitude values.

20. Apparatus for reducing the visibility of the shadow caused by a damping wire on the screen of a display device, comprising:

means for using a sensor device to locate said shadow on the screen of said display device and responsively generate amplitude values of the area of said screen immediately adjacent said shadow;

means for calculating correction values from said generated amplitude values using a processor; and means for utilizing said correction values to reduce the visibility of said shadow on the screen of said display device by using a compensator device coupled to said processor.

* * * * *